2/7/84 OR 4,430,562

United States Patent [19]

Lundblad

[11] 4,430,562

[45] Feb. 7, 1984

[54] BANKNOTE DISPENSING APPARATUS

[76] Inventor: Leif Lundblad, Häradsvägen 102, S-141 41 Huddinge, Sweden

[21] Appl. No.: 381,656

[22] Filed: May 24, 1982

[30] Foreign Application Priority Data

Jun. 4, 1981 [SE] Sweden ................................ 8103515

[51] Int. Cl.³ .............................................. G06F 15/30

[52] U.S. Cl. .................................... 235/379; 235/381

[58] Field of Search ................................ 235/379, 381; 340/825.33

[56] References Cited

U.S. PATENT DOCUMENTS 4,282,424 8/1981 Hirose ................................ 235/379

*Primary Examiner*—Harold I. Pitts

*Attorney, Agent, or Firm*—Sughrue, Mion, Zinn, Macpeak and Seas

[57] ABSTRACT

An apparatus for dispensing banknotes from a store (10) of banknotes to a receipt opening (11) accessible to a customer comprises first conveying means (13–14) for conveying banknotes to a magazine or collecting space (15), and second conveying means (16–17) for conveying the collected banknotes to the receipt opening (11). The apparatus also comprises a first keyboard (21) into which an order for the number of banknotes desired or the sum required can be inserted; a card reader (23) located adjacent the first keyboard (21); a second keyboard (22) located adjacent the card reader (23) at a location considerably further from the first keyboard (21) than the card reader (23), the individual code of the customer being entered through this second keyboard; and an electronic unit (24) for controlling the outfeed of banknotes in response to activation of the two keyboards (21,22) and activation of the card reader (23) by the customer. The electronic unit (24) is so designed that in order to activate the first conveying means (13–14) it is first necessary to activate the first keyboard (21) and the card reader (23), while in order to activate the second conveying means (16–17) it is also necessary to activate the second keyboard (22).

2 Claims, 3 Drawing Figures

BANKNOTE DISPENSING APPARATUS

TECHNICAL FIELD

The present invention relates to an apparatus for dispensing banknotes, and more particularly for dispensing banknotes from a store of banknotes to a receipt opening arranged in said apparatus and accessible to a client. The apparatus comprises first conveyor means, for conveying banknotes for said store to a collecting chamber, and second conveyor means, for conveying banknotes from the collecting chamber to the receipt opening.

BACKGROUND ART

An apparatus of this kind is disclosed, for example, in Swedish Patent Specification No. 7711412-2, which describes a dispensing apparatus having a further receipt opening and in which the second conveying means is electronically controlled in a manner such that when a cashier or customer orders banknotes to be dispensed, banknotes collected in the collecting chamber are conveyed therefrom to the receipt opening selected by the cashier or the customer when ordering said banknotes to be dispensed.

Banknote dispensing apparatus are previously known in which a customer is required to take certain steps in sequence, in order to obtain his money; the customer is required to insert a bankers card—a specific card for the transaction desired—to insert a personal code on a keyboard, insert the sum desired—receipt the withdrawal on the keyboard—remove the bankers card—and finally remove the banknotes advanced by the apparatus.

Experience has shown that because of their particular construction they are relatively slow in completing a transaction and can readily cause queues to form. The object of the present invention is to eliminate the aforementioned disadvantages, by providing an apparatus able to carry out a transaction in a relatively short period of time, which is of simple construction and easy to use.

DISCLOSURE OF THE INVENTION

In an apparatus of the afore-described kind having a store of banknotes, first and second conveying means and one or more receipt openings, there is provided a first keyboard for entering the number of banknotes required or the sum desired, a card reader, a second keyboard for inserting the code alloted to the individual making the order, and an electronic unit for controlling the whole mechanism, said electronic unit being so designed that in order to activate the first conveying means it is necessary for a client to have manipulated the first keyboard and to have activated the card reader, while in order to activate the second conveying means it is necessary for the client to also manipulate the second keyboard.

BRIEF DESCRIPTION OF THE DRAWINGS

The invention will now be described more in detail with reference to the accompanying drawings, in which.

PREFERRED EMBODIMENT OF THE INVENTION

Figure 1:
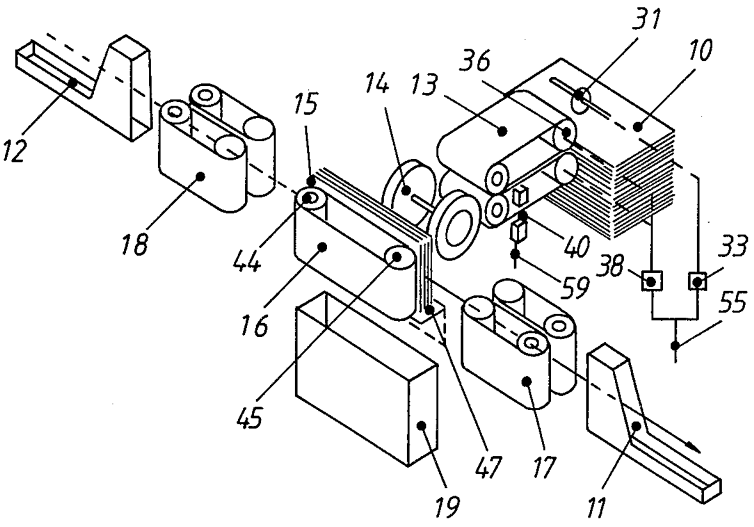
FIG. 1 illustrates schematically conveying means etc. arranged in a known banknote dispensing apparatus.
Figure 2:
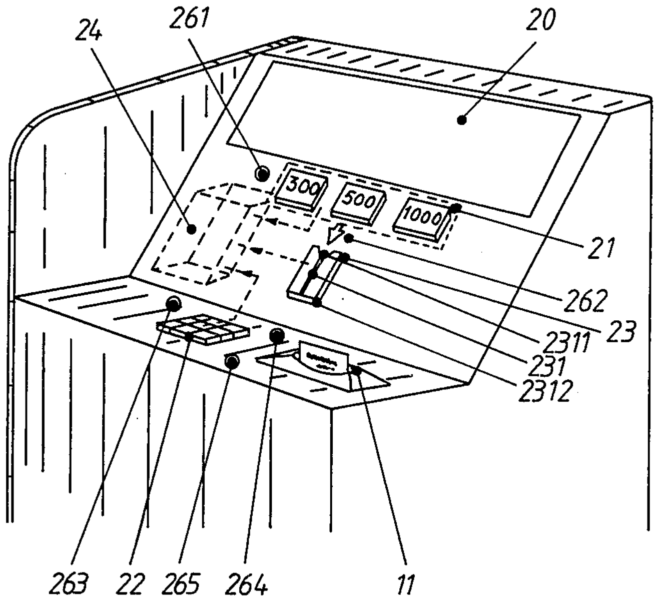
FIG. 2 illustrates part of the external construction of an apparatus according to the invention.

As will be seen from FIG. 1, the external design of a dispensing apparatus according to the invention, illustrated by way of example in FIG. 2, includes a store 10 of banknotes, a first conveying means 13,14 for conveying banknotes from the store 10 to a collecting chamber 15, and a second conveying means 15–16 for conveying a bundle of banknotes from the collecting chamber 15 to a receipt opening or to one of two receipt openings 11 and 12, via respective further conveying means 17 and 18. It is assumed in the following that two receipt openings 11 and 12 respective are provided, and hence two pulpits shown in FIG. 2 are arranged side by side, and that banknotes are supplied from a single store 10. A separate store space 19 is arranged to receive bundled banknotes which shall not be conveyed to a receipt opening.

As illustrated in FIG. 2, the pulpit-like device has a clearly visible sign panel 20, on which information can be given to the effect that the apparatus is ready for use. (If the apparatus is not ready for use, the sign panel 20 can be made to show information confirming the nearest available dispensor.) A first keyboard 21 has three relatively large buttons 300, 500 and 1000 respectively. Arranged beneath the first keyboard 21 is a card reader 23 having a narrow elongate slot 231, the input end 2311 of which faces the keyboard 21 and the other end 2312 of which faces a second keyboard 22 and a receipt opening 11.

Figure 3:
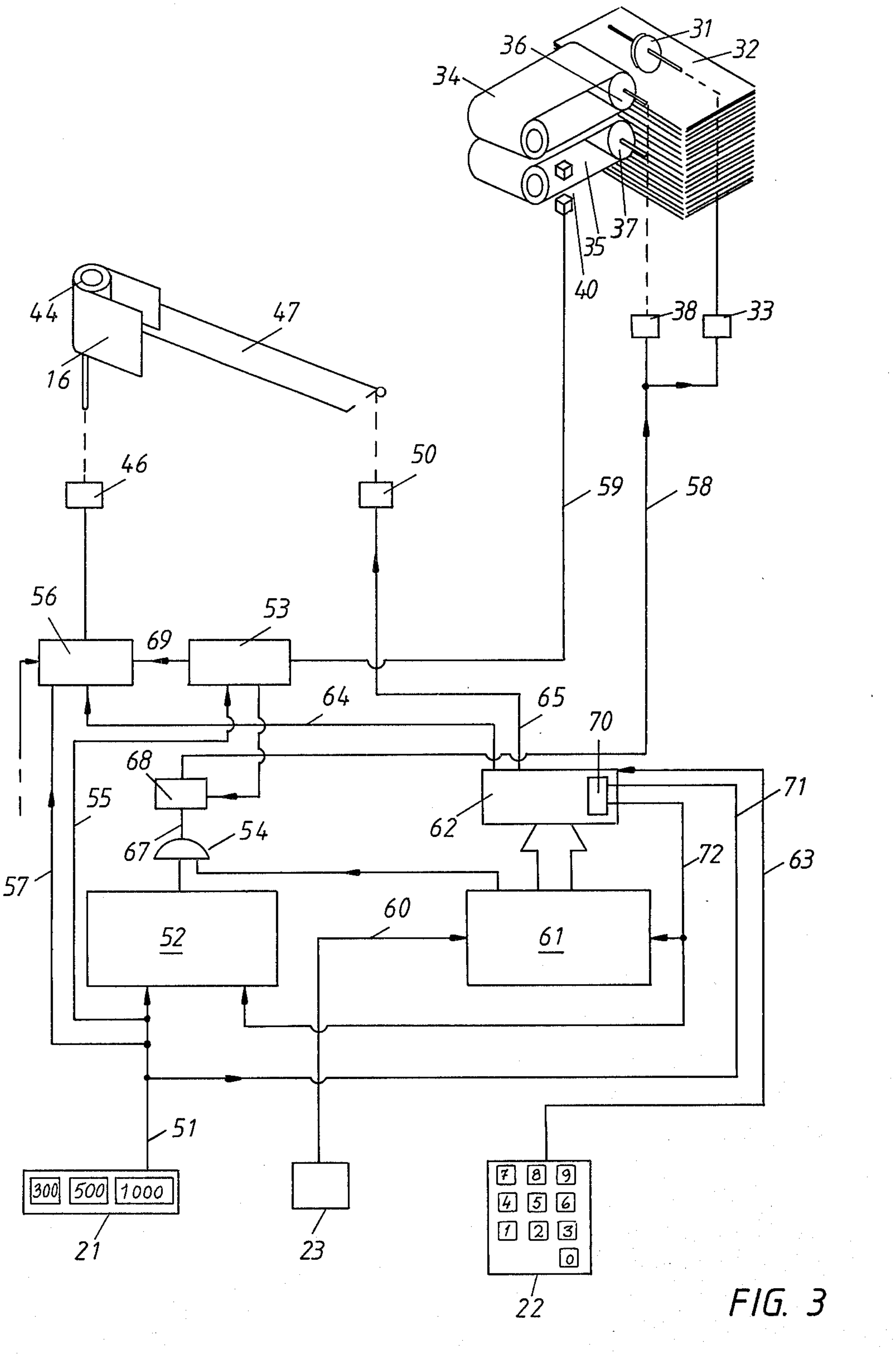
FIG. 3 illustrates the electronical control units in more detail.

The aforementioned units are caused to co-act mechanically and electrically by means of an electronic unit 24, hereinafter described in detail with reference to FIG. 3, to which control lines extend from the keyboards and the card reader and which is connected by means of lines to requisite conveying means (see FIG. 1), identifying means, counter means etc, such means being known per se and used in similar connections.

The aforedescribed apparatus has the following mode of operation. A customer approaches the apparatus while holding his bankers card, sees immediately on the sign panel 20 that the apparatus is ready for use, and presses one of the large buttons of the keyboard 21, for example the button "500", meaning in this case that the customer wishes to withdraw 500 Swedish Crowns. It is assumed in the following that the banknotes contained in the store 10 have the value of 100 Sw.Crs. and thus in this case five banknotes will be dispensed.

The 500-button will immediately light up, in acknowledgement of the customer's order. The customer than draws his bankers card through the card reader 23 in the direction shown by the large arrow. The customer then inserts his personal code on the second keyboard 22, and immediately the last digit of the code has been inserted a bundle of banknotes containing 500 Sw.Crs. is dispensed to the receipt opening 11 located to the right of the second keyboard. The time taken between ordering the sum and receiving the same is less than 10 seconds.

When one of the buttons on the first keyboard 21 is pressed, a signal is sent to the electronic unit 24, and one of three conditions necessary for dispensing the banknotes is fulfilled. Certain preparations take place in the apparatus, but none of the conveying means has yet started.

When a valid bankers card is drawn through the card reader 23, a second signal passes to the electronic unit 24, and two of the three necessary conditions are now fulfilled. The first conveying means 13–14 is then started, and a bundle of banknotes is collected in the collecting chamber 15.

When the correct personal code is inserted on the second keyboard 22, a third signal passes to the electronic unit, and all three conditions necessary for dispensing the banknotes are fulfilled. The second conveying means 16–17 starts up, and the banknotes ordered are present in the receipt opening 11 before the customer has time to lift his hand from the keyboard.

If the customer wishes to change his or her order, this can be done before inserting the personal code, namely by pressing one of the other buttons on the first keyboard, whereupon the light on the button first pressed is extinguished, and the second button illuminated. It must be mentioned in this connection that the first keyboard can comprise ten buttons, numbered from 0 to 9, to enable a selected sum to be inserted within a pre-determined maximum amount. It may also be convenient to provide a correction button, through which the effect of previous actions can be erased.

If, for some reasons or other, no personal code is inserted, or if the code inserted is wrong, the bundle of banknotes is moved, after a pre-determined length of time, e.g. 15 seconds, from the collecting chamber 15 to the storage space 19, the light in the previously pressed button ("500") being extinguished, and the apparatus being ready for use by the next customer.

As will be understood, the apparatus may also be provided with a printing mechanism operative in printing a receipt for each transaction made. Printing of the receipt is suitably done at the same time as the first conveying means starts up, the receipt passing to the receipt opening together with the banknotes from the collecting chamber.

The high speed at which the apparatus according to the invention operates is due partly to the logically correct construction and functioning of the apparatus, and also as a result of a change in attitude from the bank towards the customer; the bank relies upon the customer and assumes that the customer has the right to withdraw money. This enables the dispensing procedure within the apparatus to start earlier, namely immediately when the bankers card has been drawn through the card reader, and thus before inserting the personal code. This procedure alone enables the time taken to carry out earlier functions to be more than halved.

The described construction also eliminates the necessity of providing relatively large display means, instructing how the apparatus in question shall be used, these instructions often being of a relatively complicated nature requiring constant checks to be made, all of which results in loss of time. As will be understood, the apparatus according to the invention may also be provided with two indicating lamps arranged, for example, to blink when it is time to carry out an instruction. FIG. 2 illustrates an example of such small indicating lamps, here referenced 261–265. The lamp 261 has the form of a pointing finger and is located beneath the sign panel 20, adjacent the keyboard 21. This lamp continues to flash until a customer has pushed one of the buttons on the first keyboard 21. When the lamp 261 is extinguished, the lamp 262 lights up, and shows the large arrow between the keyboard 21 and the card reader 23. When the customer has drawn his or her card through the card reader, the lamp 262 is extinguished and the lamp 263 illuminated, in the form of a flashing arrow, adjacent the second keyboard 22. When the customer has inserted his personal code, the lamp 263 is extinguished and the lamp 264 illuminated, said lamp having the form a hand grasping a bundle of banknotes adjacent the receipt opening 25. When the customer withdraws the banknotes from the receipt opening, the lamp 264 is extinguished and, after a short space of time, the lamp 261 beneath the sign panel 20 lights up. If, for some reason or other, no banknotes are dispensed, the lamp 265 lights up, said lamp having the form of a bundle of banknotes with a wide dash drawn thereacross, located beneath the lamp 264 adjacent the receipt opening 11.

As will be understood from the aforegoing, the natural sequence of operations comprises: inserting the sum desired, reading the bankers card, and inserting the personal code. Should this sequence be changed in any way, however, for example is begun with the insertion of the personal code, this will not prevent the apparatus from functioning. It will be understood, however, that the condition on which the first conveying means will not start until the first keyboard and the card reader have been activated must still be fulfilled, while the second conveying means will not start until the first keyboard, the second keyboard and the card reader have been activated.

Although the apparatus has been described and illustrated with respect to a preferred embodiment, it will be understood that many modifications can be made within the scope of the following claims, for example, the store 10 may comprise a plurality of part stores, of which the majority contain 100-crowns-banknotes and one or more of the bundles contains 1000-crowns-banknotes, all in accordance with the technology illustrated and described, for example, in U.S. Pat. No. 4,066,253.

It will also be understood that the customer pulpit need not have the design illustrated in FIG. 2, in order for the apparatus to operate smoothly. For example, the sign panel 20, may occupy a large part of the left-hand portion of the upper, sloping front portion of the pulpit; the first keyboard 21 may be placed to the right of the sign panel 20, level therewith; the card reader 23 may be placed furthest to the right on the front of the pulpit, slightly below the keyboard 21; and the second keyboard 22 may be placed on the substantially horizontal table, beneath and slightly to the left of the card reader; while the receipt opening 25 may be located to the right of the card reader, approximately immediately beneath the card reader 23, and optionally sunk into the table. In a pulpit of this design, the card reader will still be located close to the first keyboard 21, and the second keyboard 22 will be located close to the card reader 23 and will be spaced further from the first keyboard 21 than the card reader 23.

In the aforegoing it has been assumed that the card reader 23 is of the kind with which the customer passes his bankers card through the reader without releasing his or her grip in the card. As will be understood, however, card readers which require the card to be fed thereinto and which then await the completion of the card-reading sequence before returning the card can be also be used. ;p By using a sign panel which is larger than the keyboards and the card reader, and by placing the keyboards and card reader in relation to one another in the manner described in the aforegoing, the customer will be influenced to use the apparatus in an optimal fashion, so that banknotes are dispensed with the ease intended.

The operational mode of the electronic unit 24 will be described with reference to FIG. 3, which illustrates the essential parts of the unit and the electronic circuits.

The banknotes are fed from the store 10 by means of a feed wheel 31, arranged to feed a banknote from a bundle of banknotes for each revolution of the wheel. The wheel 31 is mounted on a shaft 32 driven by a motor 33. It should be observed that the drawing is greatly simplified, and is only intended to illustrate the principal construction and functioning of the apparatus. The collecting means 15 of the illustrated embodiment is provided with a pivotable, rectangular bottom 37, mounted on a shaft 48. when the ordered number of banknotes has been dispensed correctly from the store 10, the bottom 47 is held in a substantially horisontal position. If, for some reason or other, a larger number of banknotes than that ordered is dispensed, the bottom 47 is swung to a vertical position, by an electric drive means or motor 50, whereafter the banknotes fall down into the container or storage space 19.

As before mentioned, the collecting means 15 forms a second conveying means, and comprises an endless belt 16, extending around rollers 44,45 having substantially vertical shafts. One roller, 44, is driven by means of a reversible motor 46, so that when two receipt openings 11,12 are provided, the direction in which the rollers 44,45 rotate, can be changed. Located between the collecting means 15 and the receipt opening 12 and the receipt opening 11 are provided further conveying means 18 and 17 respectively. Each of these further conveying means comprises two mutually co-acting endless belts, and it is assumed hereinafter that these conveying means are driven continuously, as are also two rollers 14 which are arranged to rotate anticlockwise and transfer one banknote at a time to the collecting means 15 from the belts 34,35 of the conveying means 13, said belts being driven by rollers 46,47.

In the illustrated embodiment, the first keyboard 21 comprises three order buttons, labelled 300, 500 and 1000 respectively. When pressing, for example, the button 500, a signal indicating the value 500 is sent over a line 51 to a memory store 52, which stores the signal, i.e. the value 500, said signal having, for example, the form of a pulse train. As will be understood, corresponding lines are provided between the buttons 300 and 1000 respectively and the memory store 52. The signal 500 appears on the output of the memory store 52, and is fed to one input of a gating circuit 54. The signal from the first keyboard 21 is also fed over a line 55 to a counter circuit 53, and sets the counter to the value 5, since five banknotes each having a value of 100 shall be dispensed. The signal is sent further from the keyboard 21 over line 57, indicating that a dispensing order has been received from the pulpit (FIG. 2), having the receipt opening 11, and this signal is received by a control circuit 36, which is constructed so that the belt 16 of the associated drive motor will be driven in the correct direction, i.e. a direction which the bundle of banknotes will be fed to the receipt opening 11.

The customer then inserts his bankers card in the card reader 23, which is of conventional design, and, for example, is arranged to read a magnetically recorded code characteristic of the customer, and sends this code over a line 60 to second memory store 61, in which the code is stored. The memory store 61 sends the information read from the card to a comparitor 62. The customer then inserts his or her code number on the keyboard 22, and the code read-off is fed to the comparitor 62, over a line 63. If the code received from the card reader 23 and the code inserted agree with oneanother, an all-clear signal is generated on line 64. If there is no agreement, an error signal is generated on line 65.

When the card reader has sent its signal to the memory store 61, the memory store generates a "received"-signal on line 66, and this signal opens the gate 54, which feeds a signal over line 67, through a start circuit 68, which is opened when the counter 53 receives its signal. This signal is sent from the start circuit to the line 58 and motors 83 and 38. The motor 33 feeds banknotes one at a time, and the motor 38 drives the belts 34 and 35, which between them feed the banknotes to the magazine or collecting means. Each banknote fed from the store 10 is counted by the means 40, which may have the form of an optoelectric means and for each banknote counted a counting pulse of given amplitude is sent over line 59 to the counter 53, which counts backwards. When five banknotes have been counted, the counter 53 is at 0 and sends a closing signal to the start circuit 68. In the illustrated and assumed embodiment, five banknotes now rest on the belt 16 and are carried by the plate 47. At the same time as the signal is sent to the start circuit 68, the counter circuit 53 sends a signal to the control circuit 56, over line 69, and there will start the reversible motor 46, and provided the comparitor has sent an all-clear signal over line 64, an activating signal is sent to the motor 56, which starts the belt 16, causing the bundle of banknotes to be moved to the receipt opening 11. If the comparitor 62 generates an error signal, the circuit 56 is not opened, and the error signal is sent instead to the motor 15 over line 55, said motor causing the bottom 47 to fall, so that the banknotes cannot be reached by the customer.

The comparitor 62 also includes a clock circuit 70, which, when one of the buttons on the keyboard 21 is pressed, is started by means of a signal on line 71, and which, if the transaction has not been completed within a given length of time, for example 40 seconds, sends disengaging signals over line 72 to the memory stores 52 and 61 and to the motor 50, so as to set the whole system to zero.

I claim:

1. An apparatus for dispensing banknotes from a store (10) of banknotes to a receipt opening (10) arranged in the apparatus and accessible to a client, said apparatus comprising first conveying means (13–14) for conveying banknotes from the store (10) to a collecting chamber (15) and second conveying means (16–17) for conveying the collected banknotes from the collecting chamber (15) to the receipt opening (11), characterized by a first keyboard (21) for disclosing the number of banknotes required or the sum required; a card reader (23) located adjacent the first keyboard (21); a second keyboard (22) arranged adjacent the card reader (23) at a location substantially further from the first keyboard (21) than the card reader (23), and on which the individual code of the customer is to be inserted; and an electronic unit (24) for controlling the outfeed of banknotes from the store (10) to the receipt opening (11) in response to activation of the two keyboards (21,22) and activation of the card reader (23) by the customer, the electronic unit (24) being so designed that it is necessary for the customer to have activated the first keyboard (21) and the card reader (23) in order for the first conveying means (13–14) to be activated, and that it is necessary for the second keyboard (22) to have been activated in order for the second conveying means (16–17) to be activated.

2. An apparatus according to claim 1, characterized in that the card reader (23) has a narrow, elongate slot (231), whose one end (2311) through which part of a bankers card shall be inserted faces the first keyboard (21), and its other end (2312) faces the second keyboard (22).

* * * * *